United States Patent [19]

Kerr

[11] 3,986,242

[45] Oct. 19, 1976

[54] PROPELLER PULLER

[76] Inventor: Robert M. Kerr, Winter Garden, Fla. 32787

[22] Filed: July 23, 1975

[21] Appl. No.: 598,217

[52] U.S. Cl. .................................................... 29/261
[51] Int. Cl.[2] .......................................... B23P 19/04
[58] Field of Search ............. 29/258, 259, 260, 261, 29/263, 264

[56] References Cited

UNITED STATES PATENTS

| | | | |
|---|---|---|---|
| 1,062,000 | 5/1913 | Hahn | 29/261 |
| 1,402,477 | 1/1922 | Carradus et al. | 29/261 |
| 1,457,795 | 6/1923 | Pizzoti | 29/261 |
| 1,620,211 | 3/1927 | Jerabek | 29/261 |
| 2,074,649 | 3/1937 | Herkimer | 29/261 |
| 3,846,898 | 11/1974 | Kerr | 29/259 |

*Primary Examiner*—James L. Jones, Jr.
*Attorney, Agent, or Firm*—Robert G. McMorrow

[57] ABSTRACT

A propeller puller has a central body section with outward fins. Chains are connected to the fins and engage about blades on the propeller, and a push member within the central body section is forced against the mounting shaft of the propeller to extract the propeller from the shaft.

2 Claims, 3 Drawing Figures

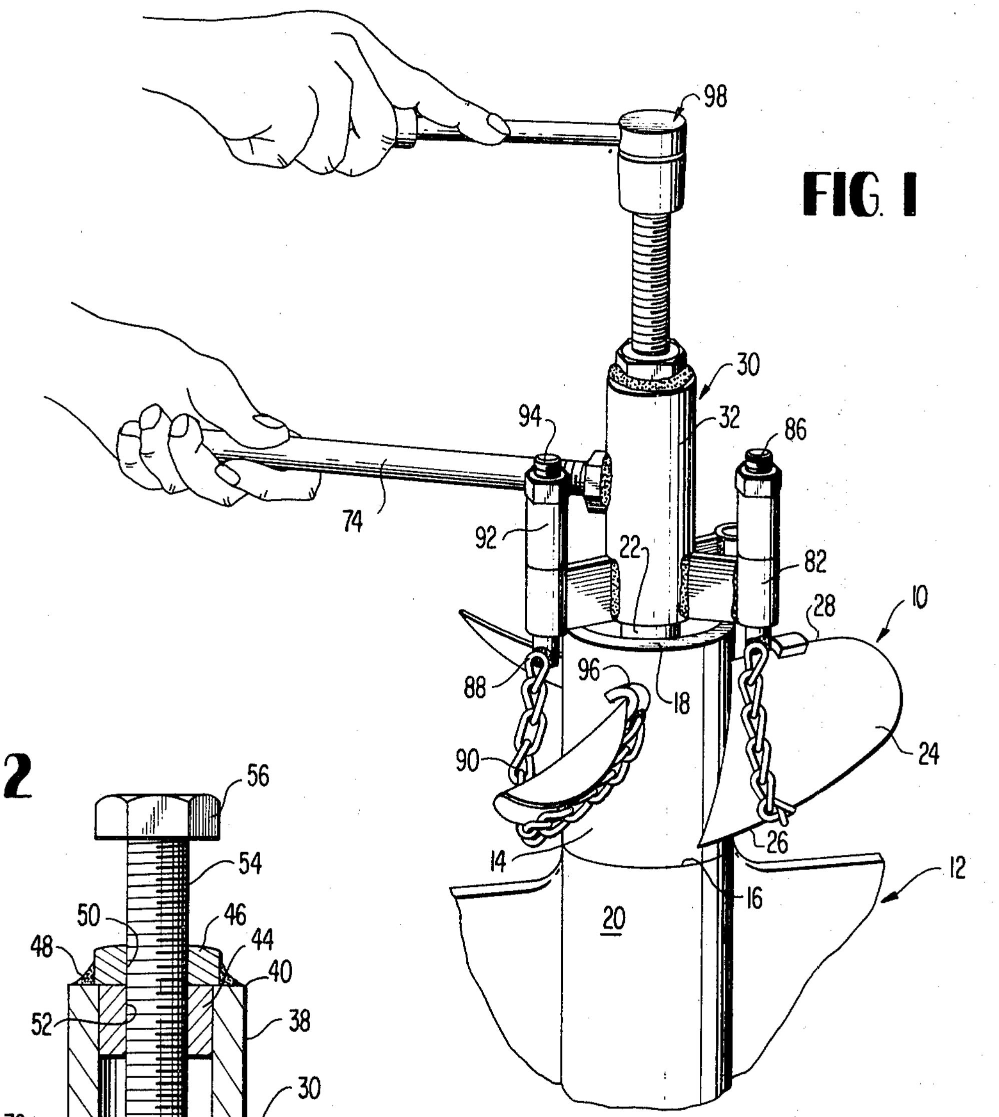
FIG. 1
FIG. 2
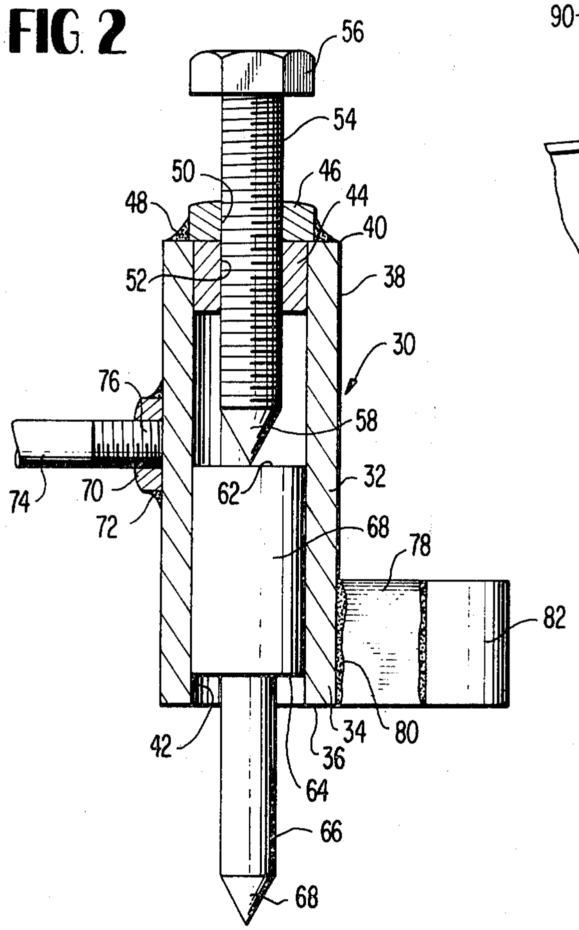
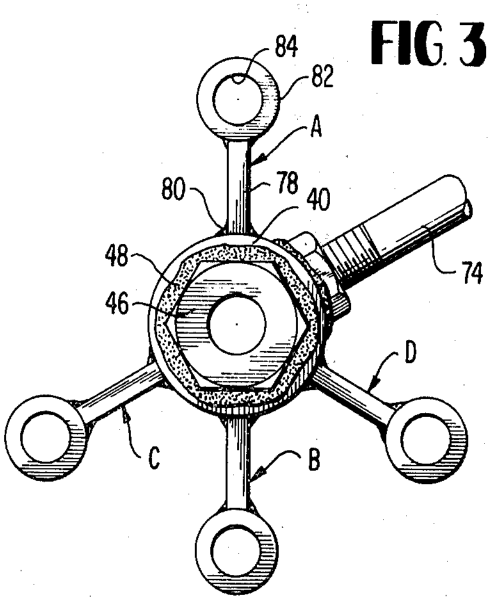
FIG. 3

PROPELLER PULLER

BACKGROUND OF THE INVENTION

1. Field of the Invention

This invention pertains to a tool employed in the removal of a propeller or the like from a mounting shaft. More particularly, the invention finds utility in the environment of repair and servicing outboard marine engines.

2. Background of Prior Art

Prior proposals in this field are generally reflected in the below listed U.S. Patents:

| Patent No. | Patentee | Issued |
|---|---|---|
| 1,026,548 | Allien | May 14, 1912 |
| 1,062,000 | Hahn | May 20, 1913 |
| 1,317,944 | Schilling | Oct. 7, 1919 |
| 1,402,477 | Carradus et al | Jan. 3, 1922 |
| 1,457,795 | Pizzuti | June 5, 1923 |

SUMMARY OF THE INVENTION

Outboard marine engines typically include a lower-unit drive assembly having a housing with a projecting shaft. Mounted on this shaft is a propeller comprised of a hub with an interior sleeve mounted on a shaft. The hub supports a plurality of blades which are of differing forms and sizes depending upon the function sought for the engine, the make and power, and other design variables. In use the propeller sleeve is tightly frictionally engaged on a shaft, on occasion via spline connections, and often becomes very tightly locked thereon. Under such circumstances, removal of the propeller has presented a serious problem. The present invention provides a safe and reliable removal tool which accomplishes this purpose with minimum danger of damage to the components of the engine, and which effectively and rapidly removes the propeller.

The propeller puller hereof operates on a lever and screw arrangement which permits the application of a uniform force to the propeller and avoids the use of heat or impact tools.

The puller is provided with a plurality of specially positioned contact fins which are readily adapted for use with different and varying blade configurations and arrangements.

Other and further objects and advantages of the invention will become apparent to those skilled in the art from a consideration of the following specification when read in conjunction with the annexed drawing.

BRIEF DESCRIPTION OF THE DRAWING

FIG. 1 is a perspective view showing a propeller puller of this invention in use;

FIG. 2 is an enlarged view of the puller partially in vertical cross-section, showing details of structure; and FIG. 3 is a top-plan view thereof.

DESCRIPTION OF THE PREFERRED EMBODIMENT

Referring to the drawing in more detail the environment of principle intended use of the invention comprises the removal of a propeller assembly 10 from the lower unit 12 of an outboard marine engine. The propeller assembly 10 here chosen for illustration has a hub 14 with inner and outer ends 16 and 18, the end 16 abutting the housing 20 of the lower unit 12. Within the hub and secured thereto by connecting walls (not shown) is a sleeve 22 which is frictionally connected on a central shaft having an end opening. The shaft is obscured in FIG. 1 by the sleeve. The sleeve is very tightly connected on the shaft, and normally cannot be removed without the application of substantial force. A series of blades 24 of curvalinear form project radially outward from the hub, and each has a leading edge 26 and a trailing edge 28.

The tool of this invention is generally identified in the drawing by reference number 30. The tool 30 comprises an elongated tubular central body section 23 having a first end portion 34 with an end edge 36 and a second end portion 38 with an edge 40. The central body section has a slideway 42 formed therein and is open at its end portion 34. The second end portion 38 has a plug 44 fixedly secured therein with a nut 46 secured, as by weld 48, on the end edge 40. The nut 46 and plug 44 have coaligned openings 50, 52 which are internally threaded to receive a correspondingly threaded axle 54 which extends therethrough. The axle has a head 56 on its outer end, and a pointed inner end 58, and is adopted for inward and outward movements responsive to rotation thereof.

Dispose slidably in the slideway 42 is a push cylinder 60 having an upper face 62 contacted by the pointed end 58 of the axle. Depending from the opposite lower face 64 of the cylinder is a reduced diameter rod 66 which also has a pointed tip end 68.

At a midpoint location on the central body section a nut 70 is secured by a weld 72 or the like. An elongated holding lever 74 is threaded at 76 for releasable engagement in the nut 70. This releasable engagement permits storage of the tool in a work kit or the like by removal of the lever 74 when not in use.

A plurality of radially arranged fins 78 are fixedly secured to the central body section, as by welds 80. These fins extend outwardly a distance such that they contact the outer end 18 of the hub when in use. The lower edges of the fins are aligned with the end edge 36 of the central body section. Fixedly secured to the outer extremity of each of the fins 78 is a tubular end member 82 having an opening 84 therein.

It is important to note (FIG. 3) that two of the fins, designated A and B in the drawing, are directly opposite one another, in diametric fashion, while the remaining two fins C and D with the fin A, trisect the periphery of the central body section. Thus, when a hub has a two-blade propeller, the fins A and B are employed, and where a three-blade propeller is encountered the fins A, C and D are utilized. A threaded axle 86 is provided for each of said tubular end members. A terminal link 88 of a link chain 90 is fixedly secured to one end of each axle 86, and the axle is extended through the end member. A spacer sleeve 92 abuts the end member, and the axle is extended through the spacer sleeve and into threaded engagement with an adjustment nut 94. On the distal end of each chain is a hook member 96.

In use, the lower unit housing 20 is conveniently positioned and the end 68 of the push cylinder is brought into position against the shaft on which the hub sleeve is mounted. The fins 78 rest on the hub outer end 18, and the chains 90 are trained about the leading edges 26 of the blades — the hooks 96 being engaged over the trailing blade edges 28. In the event of any looseness of the chains when thus engaged adjustment is made at the nut 94. The user grasps in one hand the mounted holding lever 74, and employs a rachet wrench 98 in the other hand. The wrench 98 is employed to turn the head 56 of the axle 54 thereby forcing the push cylinder 60 inwardly. Inasmuch as the chains lockingly engage the central body section and fins to the hub and blades, the propeller is extracted from the shaft by reason of this inward movement of the member.

I claim:

1. A device for removal of a propeller which includes a hub and a plurality of blades, the hub being mounted on a shaft, the device comprising:

a central body section having a slideway formed therein;

at least three fins extending radially outwardly from the central body section;

an end member on each fin and a chain adjustably secured on each of the fins;

the fins contacting the propeller hub and the chains being reverted about and engaged on the respective blades;

a holding lever on said central body section;

a push cylinder slidably mounted in the slideway of the central body section;

screw means on the central body section to force the push cylinder against the shaft; and lever tool means for turning said screw means.

2. A device for removal of a propeller which includes a hub and a plurality of blades extending from the hub, the hub being mounted on a shaft having a central opening therein, the device comprising:

a central body section comprising an elongated tubular member having a first end portion with a first end edge and a second end portion with a second end edge;

the first end edge contacting the shaft;

the tubular member having a central slideway therein;

a series of radially extending fins fixedly secured to the tubular member, each of said fins having a lower edge aligned with the first end edge of the tubular member, said lower edges contacting the hub;

each of the fins having a tubular end member;

an elongated holding lever secured to the tubular member and projecting outwardly therefrom;

an end member fixedly secured on the second end edge of the tubular member said end member having a threaded opening formed therein;

a push cylinder slidely mounted in the slideway, and having an extension with a pointed end engaging in the central opening in the shaft;

a threaded push member threadedly engaged in said threaded opening of said end member, and including an outer component engageable with a lever tool and inner component which bears against the push cylinder;

a threaded axle extending through each of said tubular end members of said fins;

a link chain on each of the axles, and nut assemblies on one side of the fins; and a hook member on each of said chains, the chains being reverted about the blades, with the hook members engaged on the blades.

* * * * *